United States Patent
Shin et al.

(10) Patent No.: US 12,325,411 B2
(45) Date of Patent: Jun. 10, 2025

(54) HYBRID VEHICLE AND CONTROL METHOD THEREOF

(71) Applicants: Hyundai Motor Company, Seoul (KR); Kia Corporation, Seoul (KR)

(72) Inventors: Dong Jun Shin, Whasung-Si (KR); Mingi Jeong, Whasung-Si (KR); Janghyo Lee, Whasung-Si (KR); Tae Hyeong Kim, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 467 days.

(21) Appl. No.: 17/747,681

(22) Filed: May 18, 2022

(65) Prior Publication Data
US 2022/0410867 A1 Dec. 29, 2022

(30) Foreign Application Priority Data
Jun. 29, 2021 (KR) .......... 10-2021-0084480

(51) Int. Cl.
*B60W 20/13* (2016.01)
*B60K 6/40* (2007.10)

(52) U.S. Cl.
CPC ............ *B60W 20/13* (2016.01); *B60K 6/40* (2013.01); *B60W 2510/0657* (2013.01); *B60W 2510/244* (2013.01); *B60W 2710/0666* (2013.01)

(58) Field of Classification Search
None
See application file for complete search history.

(56) References Cited

U.S. PATENT DOCUMENTS

| | | | |
|---|---|---|---|
| 2017/0096134 A1* | 4/2017 | Yoon | B60W 20/13 |
| 2018/0065619 A1* | 3/2018 | Kim | B60W 10/06 |
| 2018/0080403 A1* | 3/2018 | Shin | F02D 41/0097 |
| 2018/0217108 A1* | 8/2018 | Plouzek | G01N 29/2475 |
| 2018/0305901 A1* | 10/2018 | Carpenter | E02F 9/2825 |
| 2019/0001957 A1* | 1/2019 | Park | B60W 10/08 |
| 2019/0322269 A1* | 10/2019 | Sasaki | B60W 10/06 |
| 2020/0164890 A1* | 5/2020 | Shin | B60K 6/48 |
| 2020/0180599 A1* | 6/2020 | Kang | B60K 6/22 |
| 2020/0238971 A1* | 7/2020 | Hirata | B60W 30/18072 |

(Continued)

FOREIGN PATENT DOCUMENTS

| | | | |
|---|---|---|---|
| DE | 102016103807 A1 * | 9/2016 | B60L 11/1862 |
| KR | 101371475 B1 * | 3/2014 | B60W 20/00 |

(Continued)

*Primary Examiner* — Hongye Liang
*Assistant Examiner* — Nada Mahyoob Alqaderi
(74) *Attorney, Agent, or Firm* — Morgan, Lewis & Bockius LLP (57) ABSTRACT

A hybrid vehicle includes an engine which generates power by combustion of fuel; a drive motor which generates power, and is selectively operated as a generator to generate electrical energy; a battery which is connected to the drive motor and supplies electrical energy to the drive motor and charges the electrical energy generated in the drive motor; a battery management system which measures a State of charge (SOC) value of the battery; and a controller which is configured to determine a final target torque of the engine in a Hybrid Electric Vehicle (HEV) mode based on an SOC section in which the SOC value of the battery measured in the battery management system belongs.

6 Claims, 4 Drawing Sheets

(56) References Cited

U.S. PATENT DOCUMENTS

| | | | |
|---|---|---|---|
| 2020/0262310 A1* | 8/2020 | Ono | H02J 7/007194 |
| 2020/0370492 A1* | 11/2020 | Lee | B60W 10/08 |
| 2020/0391742 A1* | 12/2020 | Ariyoshi | B60W 10/08 |
| 2021/0078569 A1* | 3/2021 | Ariyoshi | B60W 10/08 |
| 2021/0119275 A1* | 4/2021 | Du | G01R 31/367 |
| 2022/0080950 A1* | 3/2022 | Lee | B60W 10/06 |
| 2022/0097676 A1* | 3/2022 | Gesang | B60W 20/14 |
| 2022/0219671 A1* | 7/2022 | Ogawa | B60W 10/26 |

FOREIGN PATENT DOCUMENTS

| | | | | |
|---|---|---|---|---|
| KR | 101806179 B1 * | 12/2017 | | B60K 6/442 |
| WO | WO-2017017289 A1 * | 2/2017 | | E02F 9/264 |

* cited by examiner

HYBRID VEHICLE AND CONTROL METHOD THEREOF

CROSS-REFERENCE TO RELATED APPLICATION

The present application claims priority to Korean Patent Application No. 10-2021-0084480 filed on Jun. 29, 2021, the entire contents of which is incorporated herein for all purposes by this reference.

BACKGROUND OF THE PRESENT DISCLOSURE

Field of the Present Disclosure

The present disclosure relates to a hybrid vehicle and a control method thereof.

Description of Related Art

A hybrid vehicle is a vehicle that utilizes two or more power sources, and generally refers to a hybrid electric vehicle driven by use of an engine and a motor. The hybrid electric vehicle may form various structures using two or more power sources formed of an engine and a motor.

In general, the hybrid electric vehicle utilizes a power train in the method of Transmission Mounted Electric Device (TMED) in which a drive motor, a transmission and a driveshaft are serially connected.

Furthermore, a clutch is provided between the engine and the motor, and the hybrid electric vehicle is operated in an Electric Vehicle (EV) mode or a Hybrid Electric Vehicle (HEV) mode depending on whether the clutch is engaged. The EV mode is a mode in which the vehicle travels only with driving force of the drive motor, and the HEV mode is a mode in which the vehicle travels with driving force of the drive motor and the engine.

When the hybrid vehicle is driven in the HEV mode, an engine torque is generally determined around an Optimal Operating Line (OOL). This is for optimizing engine efficiency and system efficiency. In the instant case, a Break Specific Fuel Consumption (BSFC) map for determining the OOL is determined through an engine experiment in a standard state at room temperature.

However, in the case where the hybrid vehicle actually travels on an actual road, when an intake temperature flowing into the engine rises as the outside temperature or the temperature inside the engine compartment rises, the filling efficiency is changed due to the change in the density of the intake air. Accordingly, an Engine Controller (ECU) of the vehicle controls an ignition time and the like for compensating for an engine output due to the decrease in the filling efficiency, and accordingly, the engine efficiency deteriorates compared to the standard state.

Furthermore, an operating point of the engine is differentiated according to a State of charge (SOC) value of the battery, and the engine torque in the normal level of the SOC value of the battery is determined around the OOL. However, when the SOC value of the battery is decreased to reach a threshold level, to a secure sufficient torque for charging the battery, the engine charges the battery by rapidly outputting a torque greater than the torque in the OOL. In the instant case, there is a problem in that efficiency of the engine sharply deteriorates and fuel efficiency of the vehicle deteriorates.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid vehicle which prevents fuel efficiency of the vehicle from deteriorating due to sharp deterioration of efficiency of an engine when a State of charge (SOC) value of a battery is lowered, and a control method thereof.

Various aspects of the present disclosure are directed to providing a hybrid vehicle, including: an engine which generates power by combustion of fuel; a drive motor which generates power, and is selectively operated as a generator to generate electrical energy; a battery which is connected to the drive motor and supplies electrical energy to the drive motor and charges the electrical energy generated in the drive motor; a battery management system which measures a State of charge (SOC) value of the battery; and a controller which is configured to determine a final target torque of the engine in a Hybrid Electric Vehicle (HEV) mode based on an SOC section in which the SOC value of the battery measured in the battery management system belongs.

The SOC section may include: a first section in which the SOC value is equal to or greater than a first setting value; a second section in which the SOC value is between the first setting value and a second setting value which is smaller than the first setting value; and a third section in which the SOC value is smaller than the second setting value.

When the SOC value of the battery belongs to the first section, the controller may be configured to determine an engine torque determined in an optimal operating line as the final target torque.

When the SOC value of the battery belongs to the second section, the controller may be configured to determine a larger value between a smaller value between a required torque of a driver and an intermediate stage part-load maximum torque and a base target torque of the engine which is an engine torque determined in an optimal operating line as the final target torque.

The intermediate stage part-load maximum torque may be determined through a part-load maximum torque after correction, to which a correction factor is reflected, and the part-load maximum torque before correction, to which the correction factor is excluded.

The intermediate stage part-load maximum torque may be determined by multiplying a part-load maximum torque after correction and a correction coefficient, and the correction coefficient may be a ratio of the part-load maximum torque after correction to a part-load maximum torque before correction.

When the SOC value of the battery belongs to the third section, the controller may be configured to determine a larger value between a base target torque of the engine which is an engine torque determined in an optimal operating line and a part-load maximum torque after correction as the final target torque.

Various aspects of the present disclosure are directed to providing a method of controlling a hybrid vehicle, in which a final target torque of an engine is determined in a Hybrid Electric Vehicle (HEV) mode, the control method including: setting a base target torque of the engine; determining a State Of Charge (SOC) section to which an SOC value of the battery belongs; and determining the final target torque based on the SOC section to which the SOC value of the battery belongs.

The SOC section may include: a first section in which the SOC value is equal to or greater than a first setting value; a second section in which the SOC value is between the first setting value and a second setting value which is smaller than the first setting value; and a third section in which the SOC value is smaller than the second setting value.

When the SOC value of the battery belongs to the first section, the controller may be configured to determine an engine torque determined in an optimal operating line as the final target torque.

When the SOC value of the battery belongs to the second section, the controller may be configured to determine a larger value between a smaller value between a required torque of a driver and an intermediate stage part-load maximum torque and a base target torque of the engine which is an engine torque determined in an optimal operating line as the final target torque.

The intermediate stage part-load maximum torque may be determined through a part-load maximum torque after correction, to which a correction factor is reflected, and the part-load maximum torque before correction, to which the correction factor is excluded.

The intermediate stage part-load maximum torque may be determined by multiplying a part-load maximum torque after correction and a correction coefficient, and the correction coefficient may be a ratio of the part-load maximum torque after correction to a part-load maximum torque before correction.

When the SOC value of the battery belongs to the third section, the controller may be configured to determine a larger value between a base target torque of the engine which is an engine torque determined in an optimal operating line and a part-load maximum torque after correction as the final target torque.

According to the hybrid vehicle and the control method thereof according to the exemplary embodiment of the present disclosure, it is possible to prevent engine efficiency from sharply deteriorating and minimizing deterioration of fuel efficiency of the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

Furthermore, the size and thickness of each configuration shown in the drawings are arbitrarily shown for understanding and ease of description, but the present disclosure is not limited thereto, and the thickness of multiple parts and regions are exaggerated for clarity.

Hereinafter, a hybrid vehicle according to various exemplary embodiments of the present disclosure will be described in detail with reference to the accompanying drawings.

Figure 1:
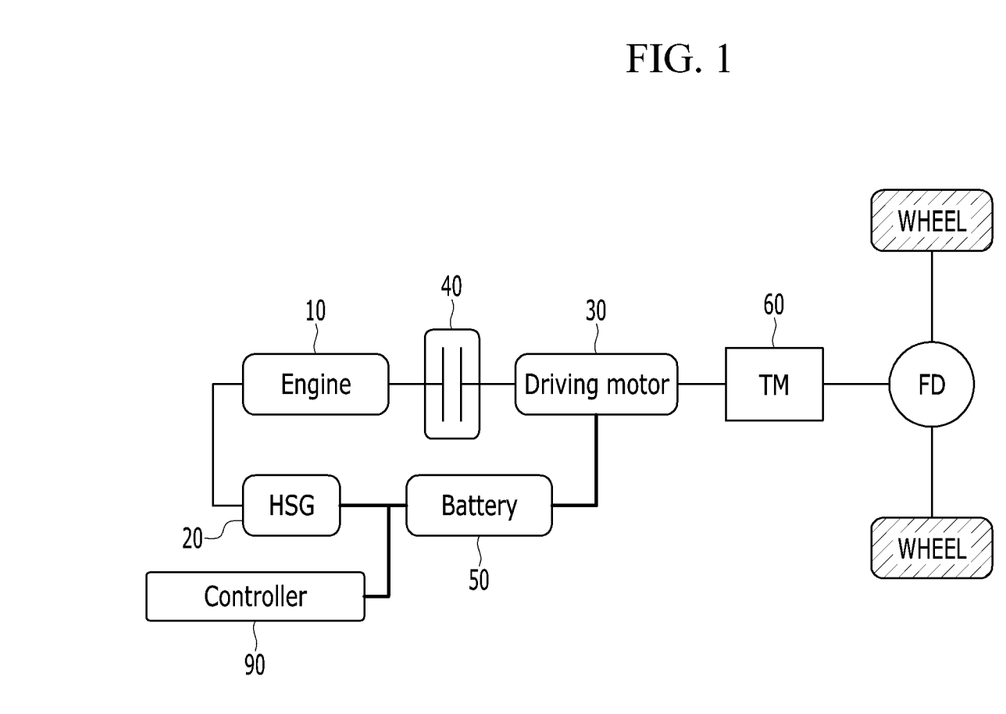
FIG. 1 is a conceptual diagram illustrating a configuration of a hybrid vehicle according to various exemplary embodiments of the present disclosure.

FIG. 1 is a conceptual diagram illustrating a configuration of a hybrid vehicle according to various exemplary embodiments of the present disclosure. Furthermore, FIG. 2 is a block diagram illustrating a configuration of the hybrid vehicle according to the exemplary embodiment of the present disclosure.

Figure 2:
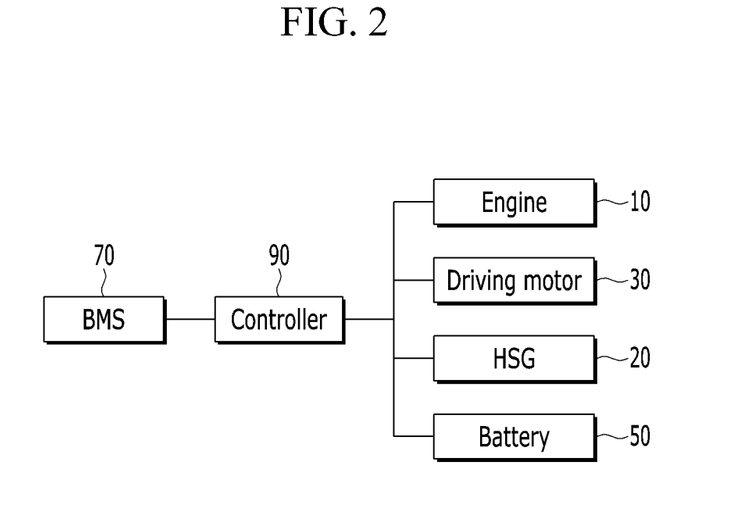
FIG. 2 is a block diagram illustrating a configuration of the hybrid vehicle according to the exemplary embodiment of the present disclosure.

As illustrated in FIG. 1 and FIG. 2, a hybrid vehicle according to various exemplary embodiments of the present disclosure may include an engine 10, a Hybrid Starter and Generator (HSG) 20, a drive motor 30, a clutch 40, a battery 50, a battery management system 70, and a controller 90.

The engine 10 generates power required for travelling of the vehicle by combusting fuel.

The HSG 20 starts the engine 10, and is selectively operated as a generator in the state where the engine 10 is started to generate electrical energy. The electrical energy generated through the HSG 20 is charged in the battery 50.

The drive motor 30 generates power required for travelling of the vehicle from the power charged in the battery 50, and is selectively operated as a generator to generate electrical energy. The drive motor 30 is operated by use of the electrical energy charged in the battery 50, and the electrical energy generated in the drive motor 30 is charged in the battery 50.

A Battery Management System (BMS) 70 determines a situation of the battery 50 through information related to the battery 50 detected in a plurality of sensors (for example, a temperature sensor, and a voltage sensor), and manages the battery 50 to have an optimum state. The BMS 70 performs functions of measuring the remaining capacity of the battery 50, maintaining the State of Charge (SOC) of the battery 50 at an appropriate level, measuring and managing the temperature of the battery 50, and the like. The SOC value of the battery measured in the BMS 70 is transmitted to the controller 90. The clutch 40 is provided between the engine 10 and the drive motor 30. Depending on the engagement of the clutch 40, the hybrid vehicle may travel in an Electric Vehicle (EV) mode or a Hybrid Electric Vehicle (HEV) mode. The EV mode is a mode in which the vehicle travels only with driving force of the drive motor 30, and the HEV mode is a mode in which the vehicle travels with driving force of the drive motor 30 and the engine 10.

Power output from the engine 10 and the drive motor 30 is transmitted to a driving wheel provided in the vehicle. In the instant case, a transmission 60 is provided between the clutch 40 and the driving wheel. A transmission gear is provided inside the transmission 60, so that power output from the engine 10 and the drive motor 30 may be changed according to a transmission gear stage.

The controller 90 controls the constituent elements of the vehicle including the engine 10, the HSG 20, the drive motor 30, and the battery 50.

The controller is configured to determine a final target torque of the engine based on an SOC section in which an SOC value of the battery 50 measured in the BMS belongs.

To the present end, the controller 90 may be provided with one or more processors operated by a set program, and the set program performs each operation of a method of controlling the hybrid vehicle according to various exemplary embodiments of the present disclosure.

Hereinafter, the method of controlling the hybrid vehicle according to various exemplary embodiments of the present disclosure will be described in detail with reference to the accompanying drawings.

Figure 3:
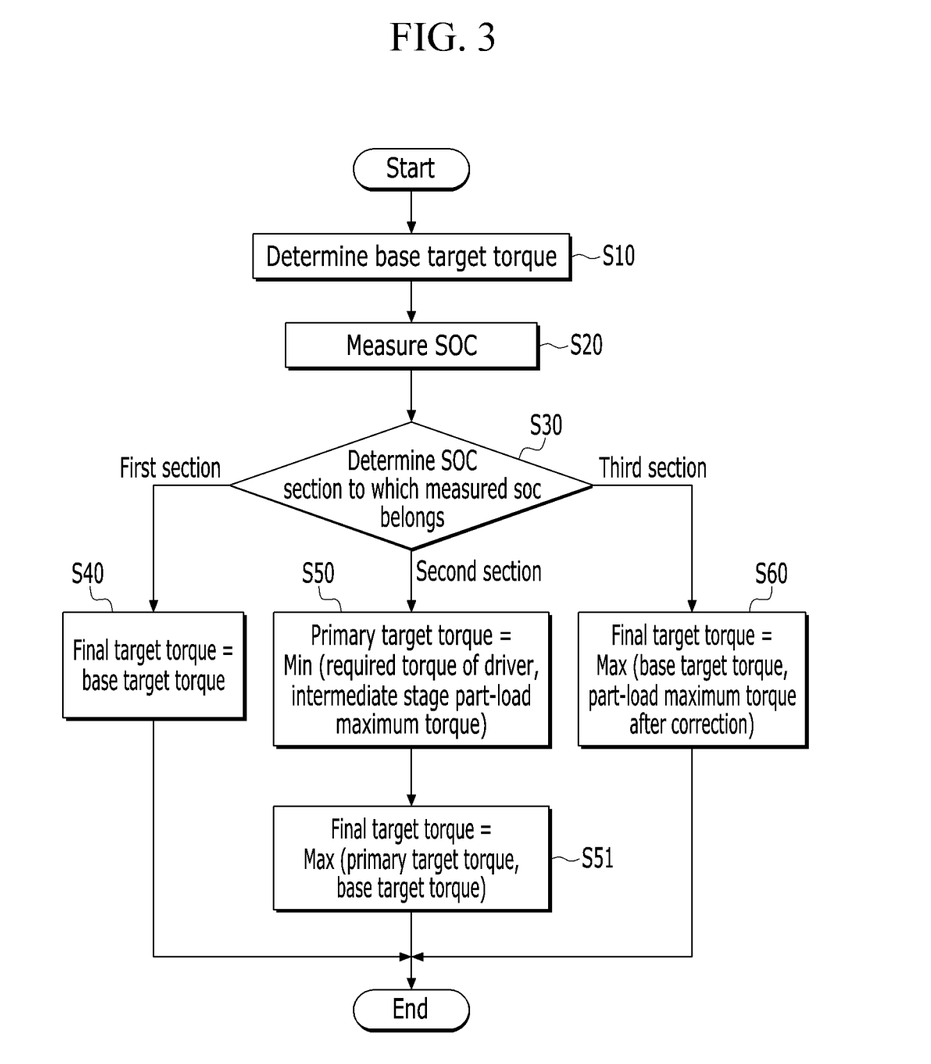
FIG. 3 is a flowchart illustrating a method of controlling a hybrid vehicle according to the exemplary embodiment of the present disclosure.

FIG. 3 is a flowchart illustrating the method of controlling the hybrid vehicle according to the exemplary embodiment of the present disclosure.

The method of controlling the hybrid vehicle of the present disclosure is to determine a final target torque of the engine in the HEV mode and control a torque of the engine to be output according to the final target torque.

As illustrated in FIG. 3, the controller 90 sets a base target torque of the engine 10 in the HEV mode (S10). The base target torque of the engine 10 may be set in an Optimal Operating Line (OOL).

The BMS 70 continuously measures an SOC value of the battery 50 and transmits the measured SOC value of the battery 50 to the controller 90 (S20).

The controller 90 divides the SOC value of the battery 50 in a plurality of sections, and determines the section in which the SOC transmitted from the BMS 70 belongs.

The SOC section of the battery may be divided into a first section to a third section.

The first section is a section in which the SOC value is equal to or greater than a first setting value (for example, 60%), and may mean a section in which the SOC value of the battery 50 is normal. In the first section, an operating point of the engine may be determined in a region in which maximum efficiency is generated.

The second section is a section in which the SOC value is between the first setting value (for example, 60%) and a second setting value (for example, 40%) which is smaller than the first setting value, and the second section may mean a section in which the amount of charging is slightly smaller than that of the normal section (for example, the first section). The second section is the section in which the little charging of the battery 50 is required.

The third section is a section in which the SOC value is smaller than the second setting value (for example, 40%), and may mean a section (for example, the section in which the SOC value is less than 40%) in which the amount of charging is greatly smaller than that of the normal section (for example, the first section). The third section may be the section in which the charging of the battery 50 is prioritized.

When the SOC value of the battery belongs to the first section (S30) (see "first section" of FIG. 4), the controller 90 determines the base target torque as the final target torque of the engine, and controls the engine 10 to output the final target torque (S40).

When the SOC belongs to the first section, the amount of charging of the battery 50 is sufficient, so that it is most important to increase the efficiency of the system. Accordingly, in the instant case, it is possible to improve system efficiency by determining the engine torque in the OOL in which the engine efficiency is highest.

In the first section, when a required torque of the driver is greater than the final target torque, the controller 90 assists the engine torque through the drive motor 30.

When the SOC value of the battery 50 belongs to the second section (see "second section" of FIG. 4) (S30), the controller 90 determines a smaller value (hereinafter, referred to as a "primary target torque") between the required torque of the driver and an intermediate stage part-load maximum torque (S50), and determines a larger value between the primary target torque and the base target torque (hereinafter, referred to as a "secondary target torque"), and then sets the secondary target torque as the final target torque. That is, the larger value between the smaller value between the required torque of the driver and the intermediate stage part-load maximum torque, and the base target torque is determined as the final target torque (S51).

The intermediate stage part-load maximum torque is determined by multiplying a part-load maximum torque after correction and a correction coefficient, which is expressed by Equation below. The correction coefficient is a ratio of the part-load maximum torque after correction to the part-load maximum torque before correction.

$$LV1 = LV2_{after} * a \qquad \text{[Equation 1]}$$

In Equation 1, LV1 is the intermediate stage part-load maximum torque, $LV2_{after}$ is the part-load maximum torque after correction, and a is the correction coefficient. The correction coefficient means a ratio of the part-load maximum torque after correction to the part-load maximum torque before correction, which is expressed by Equation below.

$$a = LV2_{after} / LV2_{beforer} \qquad \text{[Equation 2]}$$

In Equation 2, $LV2_{after}$ is the part-load maximum torque after correction, and $LV2_{before}$ is the part-load maximum torque before correction.

The part-load maximum torque before correction means the part-load maximum torque to which a correction factor is reflected, and the part-load maximum torque after correction means the part-load maximum torque to which the correction factor is not reflected (or the part-load maximum torque in which the correction factor is excluded). Herein, the correction factor may include an engine oil temperature correction torque, an intake air temperature correction torque, an atmospheric pressure correction torque, and a knocking correction torque.

That is, the part-load maximum torque before correction is the part-load torque determined by an engine experiment in the standard state, and the part-load maximum torque after correction is the part-load maximum torque output from the engine by reflecting an environmental change (for example, a change in the engine oil temperature, a change in the temperature of the intake air, and a change in the atmospheric pressure).

Herein, the part-load maximum torque is the maximum torque outputtable by the engine in a theoretical air-fuel ratio.

The part-load maximum torque before correction may be determined by Equation below.

$$LV2_{before} = (T_{max} - T_{fric}) * (R_{torque}) - T_{firc}$$ [Equation 3]

In Equation 3, $T_{max}$ is a full-load maximum torque which is the maximum torque outputtable by the engine, $T_{fric}$ is a frictional torque of the engine, and $R_{torque}$ is a ratio between the full-load maximum torque and the part-load maximum torque.

The part-load maximum torque after correction may be determined by Equation below.

$$LV2_{after} = ((T_{max} - T_{oil}) - T_{fric}) * (R_{intake}) * (R_{torque}) - T_{firc} - T_{knocking}$$ [Equation 4]

In Equation 4, $T_{oil}$ is a correction torque according to a change in the temperature of the engine oil, $R_{intake}$ is a correction factor according to the change in the intake air temperature and the atmospheric pressure, and $T_{knocking}$ is a correction torque for protecting the engine when knocking occurs.

When the SOC value of the battery 50 belongs to the second section, the SOC value is slightly lower than the normal level (the first section), so that the rapid charge is not required, but a small amount of battery charging is required. In the instant case, the controller 90 determines the smaller value between the required torque of the driver and the intermediate stage part-load maximum torque as the primary target torque and sets the larger value between the primary target torque and the base target torque of the engine as the final target torque of the engine, so that a torque slightly greater than the base target torque is output from the engine.

That is, because the torque greater than the base target torque is output from the engine in the second section, the engine efficiency slightly deteriorates, but the predetermined amount of engine torque for charging the battery 50 may be secured.

Furthermore, when the required torque of the driver is greater than the final target torque, the controller 90 assists the engine torque through the drive motor 30.

When the SOC value of the battery 50 belongs to the third section, the controller 90 determines the larger value between the base target torque of the engine and the part-load maximum torque after correction as the final target torque of the engine. Furthermore, the controller 90 controls the engine 10 so that the final target torque is output (S60).

In the instant case, a difference between the final target torque of the engine and the required torque of the driver is generated as electrical energy through the HSG 20 or the drive motor 30, and the electrical energy generated through the HSG 20 or the drive motor 30 is charged in the battery 50.

When the SOC belongs to the third section, since the amount of charging of the battery 50 is very small, so that the charging of the battery 50 needs to be prioritized. Accordingly, in the instant case, the engine 10 is operated so that the larger value between the base target torque of the engine and the part-load maximum torque after correction is output, so that the engine torque for charging the battery 50 may be sufficiently output.

Furthermore, when the required torque of the driver is greater than the final target torque, the controller 90 assists the engine torque through the drive motor 30.

Figure 4:
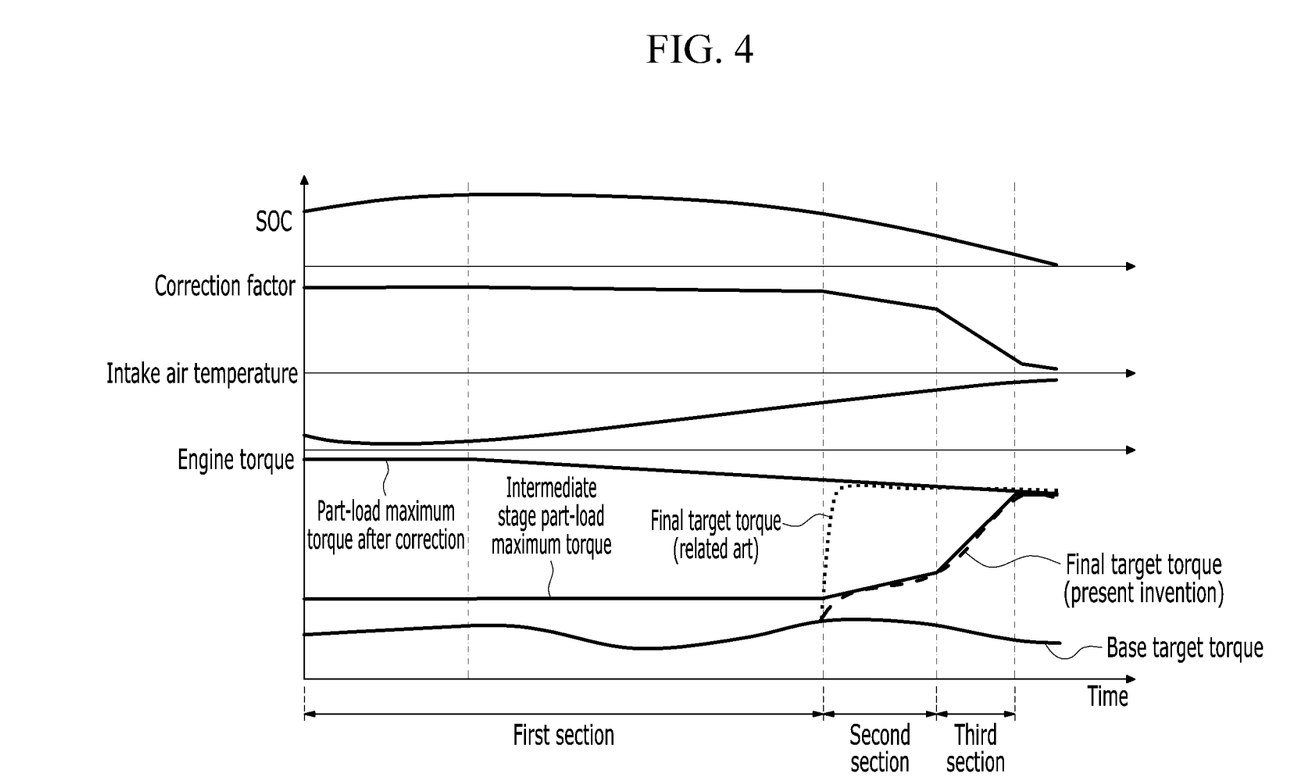
FIG. 4 is a graph illustrating an operation of the hybrid vehicle according to the exemplary embodiment of the present disclosure.

FIG. 4 is a graph illustrating an operation of the hybrid vehicle according to the exemplary embodiment of the present disclosure.

Referring to FIG. 4, the present disclosure and the related art are the same in the point that when the SOC value of the battery 50 belongs to the first section (when the SOC value is in the normal level), the final target torque of the engine is output as the base target torque.

However, when the SOC value of the battery 50 is smaller than the normal level, the engine torque is rapidly output as the part-load maximum torque (LV2) Generally, so that engine efficiency abruptly deteriorates, and thus fuel efficiency of the vehicle sharply deteriorates.

However, in the case of the present disclosure, when the SOC value of the battery 50 is lower than the normal level, the engine torque is not rapidly output, when the SOC belongs to the second section, the intermediate stage part-load maximum torque is output, and when the SOC belongs to the third section, the part-load maximum torque after correction is output.

That is, when the SOC value is slightly lower than the normal level (when the SOC belongs to the second section), the intermediate stage part-load maximum torque or the required torque of the driver greater than the base target torque is output, and when the SOC value is greatly smaller than the normal level (when the SOC belongs to the third section), the part-load maximum torque greater than the base target torque is output.

Accordingly, because the engine torque is not rapidly output as the part-load maximum torque according to the decrease in the SOC, but the part-load maximum torque is gradually output, so that it is possible to prevent engine efficiency from rapidly deteriorating and thus to minimize deterioration of fuel efficiency of the vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hybrid vehicle, comprising:
    an engine which generates power by combustion of fuel;
    a drive motor which generates power, and is selectively operated as a generator to generate electrical energy;
    a battery which is connected to the drive motor and supplies electrical energy to the drive motor and charges the electrical energy generated in the drive motor;
    a battery management system which measures a State of charge (SOC) value of the battery; and
    a controller which is configured to determine a final target torque of the engine in a Hybrid Electric Vehicle (HEV) mode based on an SOC section in which the SOC value of the battery measured in the battery management system belongs,
    wherein the SOC section includes:
        a first section in which the SOC value is equal to or greater than a first setting value;
        a second section in which the SOC value is between the first setting value and a second setting value which is smaller than the first setting value; and
        a third section in which the SOC value is smaller than the second setting value,
    wherein when the SOC value of the battery belongs to the first section, the controller is configured to determine an engine torque determined in an optimal operating line as the final target torque and control the engine to output the final target torque,
    wherein when the SOC value of the battery belongs to the second section, the controller is configured to determine a larger value between a smaller value between a required torque of a driver and an intermediate stage part-load maximum torque and a base target torque of the engine which is the engine torque determined in the optimal operating line as the final target torque,
    wherein the intermediate stage part-load maximum torque is determined by multiplying a part-load maximum torque after correction and a correction coefficient, and
    wherein the correction coefficient is a ratio of the part-load maximum torque after correction to the part-load maximum torque before correction.

2. The hybrid vehicle of claim 1, wherein the intermediate stage part-load maximum torque is determined through the part-load maximum torque after correction, to which a correction factor is reflected, and the part-load maximum torque before correction, to which the correction factor is excluded.

3. The hybrid vehicle of claim 1, wherein when the SOC value of the battery belongs to the third section, the controller is configured to determine a larger value between the base target torque of the engine which is the engine torque determined in the optimal operating line and the part-load maximum torque after correction as the final target torque.

4. A method of controlling a hybrid vehicle, in which a final target torque of an engine is determined in a Hybrid Electric Vehicle (HEV) mode, the method comprising:
    setting, by a controller, a base target torque of the engine;
    determining, by the controller, a State Of Charge (SOC) section to which an SOC value of a battery belongs; and
    determining, by the controller, the final target torque based on the SOC section to which the SOC value of the battery belongs,
    wherein the SOC section includes:
        a first section in which the SOC value is equal to or greater than a first setting value;
        a second section in which the SOC value is between the first setting value and a second setting value which is smaller than the first setting value; and a third section in which the SOC value is smaller than the second setting value, wherein when the SOC value of the battery belongs to the first section, the controller is configured to determine an engine torque determined in an optimal operating line as the final target torque and control the engine to output the final target torque, wherein when the SOC value of the battery belongs to the second section, the controller is configured to determine a larger value between a smaller value between a required torque of a driver and an intermediate stage part-load maximum torque and a base target torque of the engine which is the engine torque determined in the optimal operating line as the final target torque, wherein the intermediate stage part-load maximum torque is determined by multiplying a part-load maximum torque after correction and a correction coefficient, and wherein the correction coefficient is a ratio of the part-load maximum torque after correction to the part-load maximum torque before correction.

5. The method of controlling claim 4, wherein the intermediate stage part-load maximum torque is determined through the part-load maximum torque after correction, to which a correction factor is reflected, and the part-load maximum torque before correction, to which the correction factor is excluded.

6. The method of controlling claim 4, wherein when the SOC value of the battery belongs to the third section, the controller is configured to determine a larger value between the base target torque of the engine which is the engine torque determined in the optimal operating line and the part-load maximum torque after correction as the final target torque.

* * * * *